Oct. 21, 1930.  J. L. GISH  1,778,785
VALVE OPERATING MEANS
Filed Oct. 19, 1928
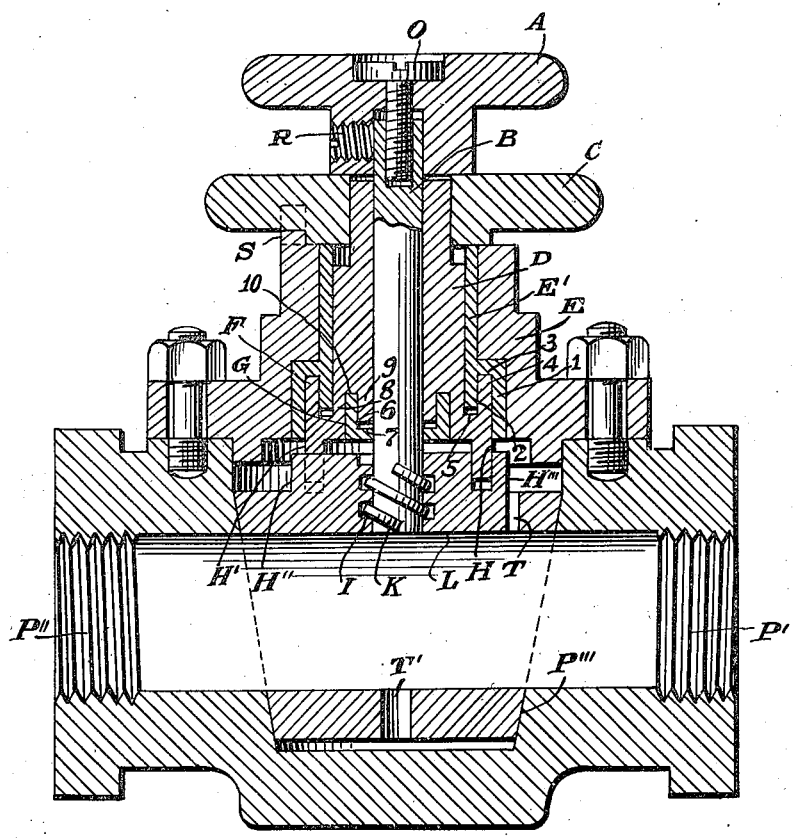
Inventor.
John L. Gish Patented Oct. 21, 1930

1,778,785

UNITED STATES PATENT OFFICE

JOHN LINCOLN GISH, OF SOUTH BEND, INDIANA

VALVE-OPERATING MEANS

Application filed October 19, 1928. Serial No. 313,534.

My invention relates to improvements in valve operating means in which two non-rising telescopic rotable operating spindles, housed in a casing, operate in conjunction with a rotary valve; and the objects of my improvement are, first, to provide each spindle at their outer ends with a stationary rotatable operating handle, whereby each spindle is rotated independently of each other; second, to afford means for an unpacked, but pressure tight, operating bearings between said spindles and between said casing and said outer spindle; third, to provide means for a vertical stable lift of said valve to a predetermined fractional part of an inch; fourth, to afford facilities, whereby said valve may be rotated to open or closed position or any fractional part thereof after the said inner spindle has been called into service; fifth, to provide means whereby said valve may be reseated and locked in open or closed position or any fractional part thereof.

I attain these objects by the mechanism illustrated in the accompanying drawing, in which is shown a vertical section of my improved device showing the rotary valve in the open position and firmly seated or locked on its valve-seat. The valve body P is provided with an inlet opening P' an outlet opening P" and a suitable valve seat P"'. A removable casing E is fastened, pressure tight, to valve body P. Member E is provided at its outer end with lugs adapted to cooperate with an arcuate recess in handle C to limit the extreme positions to which said handle may be turned. The interior surface of member E is provided with a lining E'. Rings 1 and 2, at the inner end of member E', are provided to form a groove therebetween. Spindle D, which is later to be described more fully, has an upright cylindrical ring 4 which fits within the groove between rings 1 and 2. The spaced cylindrical ring 4 forms with the spindle D an annular groove adapted to receive ring 2 so as to form an unpacked, but pressure tight, operating bearing between members E and D. Spindle D, within part E, is a stationary rotatable operating spindle provided at its outer end with an operating wheel C, contacting and supported by the outer end of member E. Spindle D is further provided, at its inner end, with lugs H and H' adapted to cooperate with lugs H" and H"' on the top side of valve L, thereby forming means to rotate valve L when the operating spindle D is called into service. Spindle D is further provided, as its inner end, with rings 8 and 9, of unequal height, forming an annular groove 10 between said rings. Annular groove 10 is adapted to engage ring 6 (part G) annular grove 7 (part G) adapted to receive ring 9, thereby forming an unpacked, but pressure tight, operating bearing between members D and B. Spindle D is also provided with an operating spindle B therein. Member B is a stationary rotatable operating spindle provided at its outer end with an operating wheel A, contacting and supported by the upper side of said operating wheel C. Member B is also provided with a gland disc G having a ring 6 and an annular groove 7. Member B, at its inner end, is further provided with a threaded section K adapted to cooperate with a threaded section I on the top side of said valve L, thereby forming means to provide a vertical stable lift to valve L to a predetermined fractional part of an inch and whereby the valve L may be reseated in open or closed position or any fractional part thereof. Member L is the rotary valve in the open position and firmly seated or locked on its valve seat P"'. T and T' are equalizing ports for valve L. O is the draw bolt, which adjusts parts A B C D and E to their respective operative positions. R is a set screw binding part A to part B, after part O has been called into service.

The improved device operates as follows,— First, the operating wheel A is given a fraction of a turn thereby rotating the spindle B and thereby actuating the threaded section K which in turn cooperates with the threaded section I, thereby imparting a vertical stable lift to the rotary valve L to a predetermined fractional part of an inch. The said vertical lift causes the contact area between the rotary valve L and its valve seat P"' to be separated to a predetermined fractional part of an inch, this having been accomplished, all strain, stress and friction between valve L and its valve seat P''' are fully overcome; second, by turning the operating wheel C the required distance, thereby rotating the operating spindle D the required distance, the said rotary valve L is rotated to open or closed position or any fractional part thereof, without force or resistance, by means of the parts H and H' cooperating with the parts H'' and H'''.

After the rotary valve L has been rotated to open or closed position or any fractional part thereof, by the parts C and D, the said valve L may be reseated in open or closed position or any fractional part thereof, providing the operating wheel C of spindle D is held in position by the hand or any other suitable means, while the operating wheel A of spindle B, is being returned to its starting position, thereby reseating or locking the valve L on its valve seat P''' in open or closed position or any fractional part thereof, during service.

Since spindle D and said spindle B having separate fixed control wheels C and A, respectively, they are thereby operated independently of each other.

What I do claim as my invention and desire to secure by Letters Patent is,—

1. In a rotary valve, a valve body having a passage-way therethrough and a valve seat therein, a rotary valve engaging said seat for controlling said passage-way and rotatable to open or closed positions, said valve being provided with a passage-way to cooperate with said passage-way in the valve-body, said valve being further provided with engaging lugs and a threaded section on the top side of said valve, a removable spindle-bearing-casing provided at its outer end with a stop to limit the rotation of an operating handle, a lining for said casing provided at its inner end with an outer ring and an inner ring of unequal height with an annular groove between said rings, an operating spindle within said casing, said spindle at its outer end being provided with an operating handle contacting with and supported on the outer end of said casing, said spindle being further provided with a spaced ring forming with the spindle an annular groove, said ring on the first named spindle being adapted to engage the said annular groove of said lining, said second named annular groove being adapted to receive the inner ring of said lining, thereby forming a pressure proof operating bearing between said first named spindle and said casing, said first named spindle being further provided at its inner end with lugs adapted to cooperate with said lugs of said valve, whereby in the rotation of said spindle the said valve will be actuated to open or closed position, said first named spindle being further provided at its inner end with an outer ring and an inner ring of unequal height so as to form an annular groove between said rings, an operating spindle within the first named spindle, said second named spindle being provided at its outer end with an operating handle contacting with and supported on the outer side of said first named handle, said second named spindle being further provided with a gland disk, said disk being provided with a ring and an annular groove, said ring being adapted to engage the said annular groove at the inner end of said first named spindle, said annular groove being adapted to receive the inner ring at the inner end of said first named spindle thereby forming a pressure proof operating bearing between the two said spindles, said second named spindle being further provided with a threaded section adapted to cooperate with a threaded section of said valve thereby providing means for a predetermined axial movement of said valve prior to the rotation of said valve and thereby providing means for the re-seating of said valve in the open or closed position or any fractional part thereof, and a draw bolt adapted to adjust the said operating means to their respective operative positions.

2. In a valve,—a rotatable, operating spindle having at its inner end an outer ring and an inner ring of unequal height with an annular groove between said rings, and a rotatable operating spindle within said first named spindle, said second named spindle being provided with a gland disk, said disk being provided with a ring and an annular groove, said ring being adapted to engage the said annular groove at the inner end of said first named spindle, said second named annular groove being adapted to receive the inner ring at the inner end of said first named spindle thereby forming a pressure proof operating bearing between the two said spindles, said spindles being further provided with mechanism adapted to cooperate with means to open or close the valve.

JOHN LINCOLN GISH.